United States Patent
Naum et al.

(10) Patent No.: US 8,007,685 B2
(45) Date of Patent: Aug. 30, 2011

(54) RED LIGHT PHOSPHOR AND MULTILAYER PHOTO-TRANSFORMING FILM

(75) Inventors: Soshchin Naum, Changhua (TW); Wei-Hung Lo, Taipei (TW); Chi-Ruei Tsai, Taipei (TW)

(73) Assignee: Wei-Hung Lo, Taipei (TW)

( * ) Notice: Subject to any disclaimer, the term of this patent is extended or adjusted under 35 U.S.C. 154(b) by 618 days.

(21) Appl. No.: 12/123,190

(22) Filed: May 19, 2008

(65) Prior Publication Data

US 2008/0290319 A1 Nov. 27, 2008

(30) Foreign Application Priority Data

May 23, 2007 (TW) ................................ 96118306 A

(51) Int. Cl.
*C09K 11/08* (2006.01)
*C09K 11/56* (2006.01)
*C09K 11/66* (2006.01)

(52) U.S. Cl. ..... 252/301.4 S; 252/301.4 H; 252/301.4 F

(58) Field of Classification Search ............ 252/301.4 S, 252/301.4 R, 301.4 F, 301.4 H, 301.6 F, 301.6 S; 423/48, 466.2

See application file for complete search history.

(56) References Cited

U.S. PATENT DOCUMENTS

| | | | | |
|---|---|---|---|---|
| 3,980,887 A | * | 9/1976 | Mattis et al. | 250/483.1 |
| 2004/0219116 A1 | * | 11/2004 | Reynders et al. | 424/63 |
| 2007/0215837 A1 | * | 9/2007 | Chiruvolu et al. | 252/301.4 R |

FOREIGN PATENT DOCUMENTS

CN 101126025 A * 2/2008

* cited by examiner

*Primary Examiner* — Jerry Lorengo
*Assistant Examiner* — Lynne Edmondson

(57) ABSTRACT

The present invention relates to a red light phosphor, which is based on sulfide and activating agent containing rare earth strontium or hafnium. It is characterized by that the aforementioned materials are a fluorine-sulfur oxide containing lanthanum-yttrium-zirconium and/or hafnium with its stoichiometric formula as $(La_{1-x-y-z}Y_xA_yMe_z^{+4}O)_2S_1(F^{-1})_{2z}$, and activating agent based on $A=(TR^{+3}=\Sigma$ Eu, Sm, Gd, Tb$)+$ $(TR^{+4}=Pr^{+4})$, in which $Me^{+4}=Zr^{+4}$ and/or $Hf^{+4}$. Compared with standard materials, the luminous intensity of the phosphor according to the present invention is increased to 1.6-2.4 times. Further, the red light phosphor according to the present invention has a mean diameter of $d_{50} \approx 0.6$ μm. The present invention also discloses a multilayer photo-transforming film, in which the three-layer agro-film is filled with phosphor. The agro-film is based on polythene and its derivatives and added with photostabilizer.

4 Claims, No Drawings

RED LIGHT PHOSPHOR AND MULTILAYER PHOTO-TRANSFORMING FILM

FIELD OF THE INVENTION

The invention relates to the technology of optical materials, and in particular relates to a red light phosphor and multilayer photo-transforming film, comprising rare earth phosphor, cathode phosphor for color cathode ray tube (CRT) screen, and phosphor for fluorescent lamp. Further, the present invention can also employ the aforementioned rare earth phosphor as photo-transforming material, i.e. thin polymer film or non-textile material, for agro-film used in green house and hot bed (closed chamber).

BACKGROUND OF THE INVENTION

Similar to the widely use of translucent agro-film based on polythene, polyvinyl chloride, and polypropylene, the use of photo-transforming agro-film is currently getting popularity, creating a much stable micro-weather in hot bed and green house. It can help protect seedlings and crops in the first spring frost and can significantly increase temperature in the growth period during summer. As a result, the application of photo-transforming agro-film has been reaching far and wide.

The phosphor filled in the agro-film can transform the short-wave portion of light, mainly the ultraviolet of the solar radiation (about 6% of the light in the middle latitude region) into the red and dark red light of the photosynthesis spectrum in visible spectrum. The red spectrum was first discovered by K. A. Timiriazev, Russian scientist. It is the essential ingredient for photosynthesis and carbohydrate (containing mainly glucose, $C_6H_{12}O_6$), which involves carbon dioxide and its formula of the chemical reaction can be expressed as:

$$6CO_2+6H_2O \rightarrow C_6H_{12}O_6+6O_2\uparrow °$$

Blue spectrum is less active in photosynthesis and yet is necessary in forming the nutritional tissues of green plant's roots and leaves. On the other hand, as established by K. A. Timiriazev and other biologists, the green-orange spectra affect only some plants' photosynthesis. They can substitute the major green pigment, a- or β-chlorophyl, predominately β-based pigment (refer to Photo-transforming Agro-film, International Nanotechnology Conference Proceeding, Nanotechnology Industry, Moscow, pp. 124-140, 2006,authored by one of the present inventors, N. P. Soshin).

Intensive use of agro-film can render green plants in a closed soil chamber to undergo stable photosynthesis. The agro-film has been protected by Russian Patent 2160289 (refer to Russian 2160289 awarded to one of the present inventors, N. P. Soshin), which discloses a polythene film commercially branded as "HARVEST." The film is filled therein with phosphor based on $Y_2O_2S$:Eu phosphor powder. The film is 100-150 μm thick and has a number of advantages in a closed soil chamber: 1. The ripe period of the first harvest is 1.5-2 weeks shorter; 2. the yield for vegetable, fruit, and economic crop has been substantially enhanced by 25-75%; 3. the temperature of the spring growth period is increased by 5-8° C.; and 4. sun burn of plants can be prevented.

Meanwhile, apart from proved and expected results, the photobiological reaction resulted from conventional agro-films has other unexpected advantages, including the enhancement of vitamin C and other trace elements in berry, vegetable, and fruit by one to two times. The advantage is usually associated with the narrow radiation frequency band of the inorganic phosphor based on $Y_2O_2S$:Eu, which has a wavelength of λ=626 nm. The luminance intensity of the radiation spectrum of the phosphor in the subband described above is equal to or higher than that of the narrow spectrum of the solar radiation. The aforementioned advantages of the phosphor based on $Y_2O_2S$:Eu have been widely confirmed in different climatic zones of the Earth. This has been disclosed in a Canada Patent, CA 2348943, awarded to Bolchoukhine, and in a Mexican patent, MX 1004165, awarded to one of the present inventors, Soshin. These two patents are therefore taken as a reference for the present patent.

Although the aforementioned sulfur oxide phosphor has the advantages described, there are substantive drawbacks, including the mass characteristic of the $Y_2O_2S$:Eu phosphor and the wide distribution of particle size of polythene.

Main drawbacks are described as follows: 1. The concentration of ultrafine particle is not high, less than $10^3$ particles/$cm^2$ (agro-film area), leading to the low luminance intensity of the agro-film; 2. The cost is too high with 1 $m^2$ of agro-film requiring 150 g of polymer material: and 3. The substantive drawback of the agro-film, according to the inventors' opinion, is related to by the over-sized particles of phosphor used for the filler of agro-film, the mean particle size being $d_{cp}$=10-12 μm and the largest size being d≈30-35 μm.

Material synthesis technology experiments have been conducted to resolve the drawbacks associated with the phosphor based on $Y_2O_2S$:Eu. One of the present inventors, N. P. Soschin, has been awarded a Russian patent, SU 1450358, which discloses the batching method for materials and semi-products required. The materials disclosed in the patent have been selected as a prototype for further improvement; the luminance intensity can be enhanced by 10-15%, but the increase in the volume concentration per unit area of phosphor is not significant.

Accordingly, the present invention is aimed to improve the aforementioned drawbacks of the conventional technology, namely low volumetric concentration and relative luminance intensity of the sulfur oxide phosphor used in agro-film.

SUMMARY OF THE INVENTION

To overcome the drawbacks of aforementioned conventional prior art, it is a primary object of the invention to provide a red light phosphor which can enhance the volumetric concentration and relative luminance intensity of the sulfur oxide phosphor in agro-film.

To overcome the aforementioned conventional drawbacks, it is another object of the invention to provide a red light phosphor which has high radiation spectrum intensity, exhibits high quantum efficiency, and can transform short wavelength ultraviolet radiation into red-light radiation.

To overcome the aforementioned conventional drawbacks, it is also another object of the invention is to provide a red light phosphor whose mean particle size is comparable to the wavelength of red light and green light emitted thereon.

To overcome the aforementioned conventional drawbacks, a further object of the present invention is to provide a multilayer photo-transforming film containing fine phosphor as filler which is characterized by its high photobiological effect and thereby able to enhance crop yield.

To achieve the aforementioned objects, the present invention provides a red light phosphor which comprises sulfide and activating agent containing rare earth strontium and/or hafnium, characterized by that the aforementioned sulfide is a fluorine-sulfur oxide containing lanthanum-yttrium-zirconium and/or hafnium with overall stoichiometric formula as $(La_{1-x-y-z}Y_xA_yMe_z^{+4}O)_2S_1(F^{-1})_{2z}$, and the activating agent is based on $A=(TR^{+3}=\Sigma\ Eu\cdot Sm\cdot Tb)+(TR^{-4}=Pr^{+4})$ with $Me^{+4}=Zr^{+4}$ and/or $Hf^{+4}$.

To achieve the aforementioned objects, the present invention provides a multilayer photo-transforming film for greenhouse and hotbed comprises phosphor filler and photo stabilizing polymer, which is characterized by the multilayer photo-transforming film containing translucent polymer of uniform thickness based on low-density polythene and/or ethyl acetic acid ethylene ester which is filled with phosphor of the aforementioned constituent, the film's outer and middle layers containing inorganic photo-transforming constituent and inner layer added with organic stearic acid to prevent liquid droplet and water vapor from forming on the film surface.

DETAILED DESCRIPTION OF THE INVENTION

First, the purpose of the present invention is to overcome the drawbacks of aforementioned sulfur-containing red light phosphor. To achieve the object, the phosphor according to the present invention comprises sulfide and activating agent containing rare earth strontium and/or hafnium, characterized by that the aforementioned material is fluorine-sulfur oxide containing lanthanum-yttrium-zirconium and/or hafnium with overall stoichiometric formula as $(La_{1-x-y-z}Y_xA_yMe_z^{+4}O)_2S_1(F^{-1})_{2z}$, and the activating agent is based on $A=(TR^{+3}=\Sigma\ Eu\cdot Sm\cdot Gd\cdot Tb)+(TR^{+4}=Pr^{+4})$ with $Me^{+4}=Zr^{+4}$ and/or $Hf^{+4}$.

Wherein the stoichiometric value of the stoichiometric formula, $(La_{1-x-y-z}Y_xA_yMe_z^{+4}O)_2S_1(F^{-1})_{2z}$, is $x=0.001$-$0.2$, $y=0.01$-$0.2$ and $z=0.001$-$0.005$, respectively.

Wherein when the ionic concentration ratio is $0.050<Eu/(Pr+Sm+Eu+Gd+Tb)\leq0.15$, the main radiation wavelength of the phosphor is within the range $\lambda=615$-$628$ nm.

Wherein the ionic concentration ratio is $0.06<(Eu+Sm)/Tr^{+3}\leq0.095$, the excited spectrum of the phosphor is within the ultraviolet wavelength range $\lambda=320$-$410$ nm: and wherein when the mean particle size of the red light phosphor is within the range $0.4\leq d_{50}\leq0.8$ μm with its largest size no more than $d=6$-$8$ μm.

The composition of the phosphor according to the present invention will be briefly described as follows. The phosphor according to the present invention, not the widely used yttrium-europium oxysulfide, is lanthanum-yttrium oxysulfide solid solution further added with IV family elements, $Zr^{+4}$ and/or $Hf^{+4}$ for example. The substantial increase of the luminance intensity of the phosphor according to the present is mainly due to the IV family elements added; the small-sized $La^{+3}$ and/or $Y^{+3}$ and $Zr^{+4}$ and/or $Hf^{+4}$ are excited by the light of wavelength between $\lambda=365$-$405$ nm. These ions have higher charges and are smaller in size, leading to substantive increase in the crystal field intensity of the electrostatic field inside the inorganic substance of fluorine-sulfur oxide and thereby enhance the luminance intensity.

Further, to uniformly distribute the quadrivalent ion $Zr^{+4}$ and/or $Hf^{+4}$ inside the crystal based on trivalent ions $La^{+3}$ and $Y^{+3}$, $F^{-1}$ ions have to be added into the cationic crystal. In the cation lattice points of a given fluorine-sulfur oxide, the exact positions of $F^{-1}$ ions added have to be accurately confirmed in the future. At the moment, the $F^{-1}$ interstitial positions can be reasoned and their positions can be partly substituted by oxygen ions according to the equation $O_0^{-2}=F_i^{-1}+F_0^{-1}$. When $Zr^{+4}$ are substituted by part of $La^{+3}$ or $Y^{+3}$, the overall equation can be written as $(Zr^{+4})=F_i$ or $(ZrY^{+4})=(F_0^{-1})+F_i^{-1}$.

These equations can further explain that the internal crystal field intensity in the phosphor host is enhanced due to the addition of IV family elements ($Zr^{+4}$ and/or $Hf^{+4}$) and interstitial $F^{-1}_i$.

Finally, the phosphor based on oxysulfide according to the present invention can not only be excited by $Eu^{+3}$, but also be excited by $Sm^{+3}$, $Gd^{+3}$, and $Tb^{+3}$. The phosphor host according to the present invention can also employ $Pr^{+4}$ as activating agent and sensitizing agent, which is characterized by oxidation degree: $+4$–$Pr^{+4}=Tr^{+4}$. The ions in the activating agent and compatible activating agent of fluorine-sulfur oxide crystal can also increase the luminance intensity of the phosphor. According to the results obtained, the increment of the luminance intensity of the phosphor is described as follows: 1. The luminance intensity is increased by 30-50% with the addition of $La^{+3}$; 2. The luminance intensity is increased by 10-20% with the addition of interstitial $F^{-1}$, which is also used as an $O^{-2}$ substituent; 3. The luminance intensity is increased by 5-15% with the addition of $Zr^{+4}$ and/or $Hf^{+4}$ as well as $La^{+3}$ or $Y^{+3}$ for partial substitution; and 4.: The luminance intensity is increased by 25-30% with the addition of $Pr^{+4}$ and $Tb^{+3}$ as complementary activating agent or sensitizing agent.

The total luminance intensity of fluorine-sulfur oxide containing yttrium-lanthanum-zirconium is increased by 90-140% under the activation of europium, samarium, terbium, and praseodymium. The substantive increase in luminance intensity is characterized by the ionic concentration being $0.050<Eu/(Pr+Sm+Eu+Gd+Tb)\leq0.15$ and the main wavelength of the radiation of the phosphor being between $\lambda=615$-$628$ nm. In the mean time, its complementary radiation is within the wavelength $\lambda=705$-$715$ nm, the dark red light in the long-wavelength range of the radiation spectrum. It has to point out that the effects of long wavelength radiation on promoting plant growth (stalks, roots, and leaves) and the information exchange of green plant recombinant tissue demand further study.

The radiation spectrum excited by the photoluminescence of the phosphor substantively shifts the spectrum toward longer wavelength of 390-410 nm. The phosphor according to the present invention, different from the similar existing phosphor, has the total concentration ratio of $S(Eu+Sm)$ to all the rare earth cations $S(Tr^{+3})$ in the range of $0.06<(Eu+Sm)\leq0.095$. Under this condition, the total excited spectrum of the phosphor is within the ultraviolet wavelength $\lambda=320$-$410$ nm.

One important characteristic of the phosphor according to the present invention is that the particle size of the phosphor is comparable to the wavelength of the light emitted at the phosphor. The median particle size of the phosphor according to the invention is $d_{50}=0.4$-$0.8$ μm, comparable to the medium wavelength range $\lambda=628$-$715$ nm or the mean wavelength $\lambda\approx0.65$ μm; that is to say that the geometric particle size of the phosphor $d_{60}=0.6$ μm is comparable to the wavelength of the light emitted at the phosphor. Also, the largest median particle size of the phosphor does not exceed $d_{max}=6$-$8$ μm. Compared to the conventional phosphor with a median particles of $d_{50}=10$-$12$ μm, the phosphor according to the present invention has achieved an improvement in enhancing luminance intensity by 1.8-2.4 times by substantively reducing the particle size. The substantive increase in the luminance intensity of the phosphor according to the present invention lies in the preparation method of the new phosphor of fluorine-sulfur oxide containing yttrium-lanthanum-zirconium.

For photoluminescence materials based on rare earth oxysulfide and/or fluoroxide, one of the existing preparation methods includes conducting an initial high temperature process for yttrium-europium oxide (or oxalate) and free sulfur, wherein free sulfur appears in the following compound, $MeSn (n=5$-$10$, $Me=K$ or $Na$) and the temperature is around 1100-1250° C. The process is usually conducted in a closed alloxite or carbon-glass crucible under a reduction atmosphere to ensure the burning of free sulfur, i.e. the interaction of partial free sulfur with oxygen. During the preparation, it is necessary to add hydrogen fluoride when oxyfluoride is employed to substitute free sulfur. During heat decomposition, ammonium bi-fluoride is decomposed and reacted with original yttrium-europium oxide. Although the preparation method and its product have been popular, there are several substantive drawbacks: 1. The synthesis process lasts for four to eight hours; 2. The consumption of sulfide and/or fluoride agents has been large, exceeding 2.5-3 times of their stoichiometric values; 3. During the synthesis process, the crucible is seriously corroded due to the presence of alkaline products or fluoride.

One of the large drawbacks of the known preparation method for the oxysulfide phosphor is the large particle variance of the synthetic materials. Since the initial raw material, yttrium-europium oxide, has a particle size of $d_{50}$=4-6 μm; therefore, the minimum phosphor particle size is within the same or higher level. During the synthesis process, the particle size will grow substantively, usually reaching $d_{50}$=8-10 μm. Large particle variance will destroy some important properties of agro-film, tensile and compressive strengths for example.

To overcome the drawbacks of the preparation method of the oxysulfide phosphor, the present invention provides a preparation method for the red light phosphor, which involves a heat shock reaction of rare earth hydroxide, IV-family elements hydroxide, sulfide, and fluoride and thereby leads to a chemical co-precipitation. The preparation method is characterized by the co-precipitation of the hydroxides in nitrate solution and/or acetate solution, the temperature of the thermal reaction of sulfide and fluoride being at the range of T=200-900° C., and the initial particle size of the co-precipitated hydroxide being $d_{50}$=0.050-0.10 μm.

Wherein the temperature for hydroxides co-precipitation in nitrate solution and/or acetate solution is about 80° C. with its hydrogen ions concentration being PH>2; and wherein the fluoride is selected from $(NH_2)_2CS$, $CH_3CSNH_2$, or $NH_4CNS$ with the oxidation degree of sulfur is −2; fluoride is selected from $NH_4YF_2$ or $NH_4BF_4$; and the mass ratio of rare earth hydroxide, sulfide, and fluoride ranges from 0.5:2:1 to 2:2:1.

The present invention provides a preparation method for synthesizing randomly distributed fine and ultrafine red light phosphor, comprising a heat shock reaction of rare earth hydroxide, IV-family elements hydroxide, sulfide, and fluoride. The preparation method is characterized first by the co-precipitation of hydroxides of the aforementioned elements in nitrate solution and/or acetate solution at the temperature of T≈80° C. with the hydrogen ions concentration in the medium being PH>2; then, the thermal process of sulfide and fluoride reactions occur at the temperature range of T=200-900° C., and the initial particle size of the co-precipitated hydroxide is $d_{50}$=0.050-0.10 μm.

It has to point out first that the original product of the preparation method according to the present invention is hydroxide, which is obtained from initial nitrate solution or acetate solution. These solutions interact to form hydroxide. The concentration of the main substance in the solution is 0.5-4 m/L with hydrogen ion being PH>2. During the preparation process, if is found that the excessive acidic medium in original solution consumes a large amount of original agent, lanthanum compounds especially. It then becomes PH>5 and the co-precipitation of hydroxides leads to aggregation. The concentrated ammonia solution (~20%) required for the hydroxide co-precipitation is added into the reactor and thoroughly mixed with original nitrate solution. The optimum precipitation temperature is 75-80° C. because higher temperature will consume excessive original materials; on the other hand, when the precipitation temperature is lowered to 40° C., hydroxide will aggregate significantly, leading to the formation of about 1 μm agglomerates.

The analysis of the co-precipitated products indicates that, in the constitutes of $(La_{0.5}Y_{0.4}Eu_{0.09}G_{0.005}Tb_{0.005})(OH)_3 \cdot nH_2O$ for example, the stoichiometric ratio of lanthanum ion to yttrium ion remains unchanged and the concentration ratio of europium ion is [Eu]/[La+Y]=0.1 and [La]/[Y]=1.25. It is difficult to employ the conventional photo-sedimentation method to conduct the variance analysis for the co-precipitated hydroxides. Instead, laser-diffractometer has to be used to accurately measure the particles of minimum size d=0.01 μm. The instrument is, for example but not limited to, the Analyzer 2000 made by Fritzsch company, Germany, or similar instrument made by Chinese company.

The co-precipitated hydroxides prepared according to the present invention are dried in a baking oven at a temperature of 150° C. to remove any absorbed water. The resulted white shining product is then crushed and ground to blocks or flakes with a thickness of about 10 mm. The product and sulfide or fluoride are easier to be ground into fine particles in a drum grinder or mixing machine. There are more than one substantive advantages of the preparation method for the oxysulfide phosphor according to the present invention. The preparation method is characterized by that fluoride is selected from $(NH_2)_2CS$, $CH_3CSNH_2$, or $NH_4CNS$ with the oxidation degree of sulfur is −2; fluoride is selected from amides, $NH_4YF_2$ or $NH_4BF_4$; and the mass ratio of rare earth hydroxide, sulfide, and fluoride is 0.5:4:1 to 2:4:1.

The embodiment of the preparation method according to the present invention is described as follows. First, it has to point out that in sulfide and fluoride there is no IA family cation, which is formed during the heat process of molten alkaline oxide (hydroxide) and thus induces the accelerated corrosion of crucible, i.e. alloxite or carbon-glass being melted. The second substantive difference of the preparation method according to the present invention lies in the fact that the change of the oxidation degree of the vulcanizing agent. In the existing preparation method for fluorine-sulfur oxide, the oxidation degree of free sulfur S0 or sulfur dioxide is 0 or +4. From the formulas of the materials, it is known that the oxidation degree of the vulcanizing agent in the preparation method according to the present invention is −2.

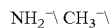

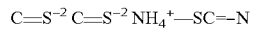

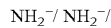

The aforementioned materials according to the present invention have an important characteristic, all having a low melting temperature ($T_m$): $(NH_2)_2CS$, $T_m$=168° C.; $CH_3CS—NH_2$, $T_m$=108.5° C.; and $NH_4SCN$, $T_m$=149.5° C. The characteristic can be observed experimentally; at T=200° C., molten sulfide medium has undergone vulcanization in the first stage of the process. As indicated in the present invention, the diffusion of $S^{-2}$ towards the initial surface of the hydroxides occurs during the melting of the materials. The diffusion process docs not show any reduction, which is reflected in the solid phase or gaseous phase reaction.

In the present invention, it also has to point out that during the decomposition process of hydroxides and sulfides, the gaseous products $H_2O$, $NH_4OH$, and $CO_2$ will be formed. They can promote the transformation of the oxidation atmosphere in the crucible with initial products into neutral or weak reduction atmosphere. During the synthesis process, the decomposition processes of the vulcanizing and fluorinating agents are very similar; the decomposition of $NH_4HF_2$ is $NH_4HF_2 \rightarrow NH_3 + 2HF\uparrow$ and $NH_4BF_4 \rightarrow NH_3 + HF\uparrow + BF_3\uparrow$.

The optimum filling framework for crucible according to the present invention can be experimentally confirmed. The mass ratio of co-precipitated hydroxide to sulfide is 2:4 and, when fluoride is added, the ratio of three materials is 2:4:1. According to the experimental data of the present invention, the 1000 mL alloxite crucible is filled with 400 g hydroxide containing rare earth and IV family element as well as 400 g of sulfide. The ingredients are compressed compactly and covered tightly with a pressing block of alloxite mineral wool. The crucible is placed in a heating furnace made of silicon-alloy, of which temperature history is described as follows:

| | |
|---|---|
| 20-100° C. | heating rate 2° C./min |
| 100-200° C. | heating rate 2° C./min |
| 200-400° C. | heating rate 4° C./min |
| 400-900° C. | heating rate 5° C./min |
| 900° C.- | maintaining one hour |

The entire heating process lasts for about live hours. The heating furnace and the crucible inside are then cooled naturally to 80° C. The products inside the crucible are then unloaded and cleansed three times with the third cleansing water being acidified to PH=4 in advance. The products prepared are then loaded into the reactor, in which the surface of the synthesized particles of fluorine-sulfur oxide containing rare earth elements and IV family elements arc deposited with very thin modified coating which is based on the nano-scale $SiO_2$ thin film hydrolyzed from 1% $Si(OC_2H_5)_4$ solution. The modified particles of phosphor are dried at T=120° C. for two hours. At this stage, the phosphor will obtain strong ointment color and illuminate strong light under ultraviolet lamp of wavelength $\lambda=365$ nm. The testing of the phosphor prepared demands the use of spectral comparator and laser diffractometer manufactured by Sensing Company. The parameters obtained from the test are shown in Table 1.

For all the synthesized forms of phosphor, their hydrolyte and photostability can also be confirmed, just like the data cited in Table 1. The accelerated aging experiment was performed as follows; temperature was raised from T=80° C. to T=100° C. under the radiation of ultraviolet of $\lambda=365$ nm wavelength and 5 W/cm$^2$ power density. After the time equivalent to two months' luminous exposure, the optical parameters of the phosphor did not show any substantive change (less than 5%).

The present invention further provides a multilayer photo-transforming film filled therein with phosphor and photostabilizing polymer. It is characterized by that the multilayer photo-transforming film comprises translucent polymer of uniform thickness; the polymer is based on low density polythene (LDPE) and/or ethylene-vinyl acetate (EVA) and is filled with phosphor of the aforementioned composition; and the film's outer and middle layers containing inorganic photo-transforming constituent and inner layer is added with organic stearic acid to prevent liquid droplet and water vapor from forming on the film surface.

Wherein the mass concentration of the phosphor is 0.1-0.5%.

Wherein the inorganic light-transforming constitute accounts for 0.2-0.6% of total mass.

Wherein the thickness ratio of the polymer films is 1:1:1 to 1:2:1 with the unit thickness of the film is 20-50 μm and the total light transmittance of the film being larger than 80%.

Wherein the solar radiation of short wavelength can be transformed with a quantum efficiency of 50-90%, which is capable of stimulating photobiological reaction in green plants and enhancing crop yield by 35-70%; and wherein the solar radiation of 180-250 nm short wavelength can be transformed to orange-red and red luminescence.

The multilayer photo-transforming film (abbreviated as agro-film below) according to the present invention can be used as modern photo-transforming agro-film for greenhouse and hotbed. The single-layer agro-film produced in the first stage has been out of date. The structural drawbacks of the existing agro-film include large thickness, high consumption of polymer (i.e. polythene), unbalanced luminance intensity

TABLE 1

| No | Phosphor composition | Emitting color | Chromatic coordinate y | Median diameter μm |
|---|---|---|---|---|
| 1 | $(La_{0.8}Y_{0.1}Eu_{0.08}Gd_{0.01}Zr_{0.005}Pr_{0.005}O)_2S_1F_{0.005}$ | Red $\lambda = 627$ nm | 0.635 0.358 | 0.6 |
| 2 | $(La_{.8}Y_{.08}Eu_{0.11}Hf_{0.005}Tb_{0.005}Pr_{0.005}O)_2S_1F_{0.01}$ | Red $\lambda = 628$ nm | 0.645 0.345 | 0.55 |
| 3 | $(La_{0.9}Y_{0.01}Eu_{0.08}Zr_{0.005}Tb_{0.001}O)_2S_1F_{0.02}$ | Red $\lambda_1 = 628$ nm $\lambda_2 = 708$ nm | 0.642 0.356 | 0.80 |
| 4 | $(La_{0.78}Y_{0.01}Eu_{0.19}Zr_{0.001}Gd_{0.001}O)_2S_1F_{0.002}$ | Red $\lambda = 629$ nm $\lambda = 710$ nm | 0.655 0.344 | 0.44 |
| 5 | $(La_{0.7}Y_{0.05}Eu_{0.19}Zr_{0.010}Zr_{0.005}O)_2S_1F_{0.01}$ | Dark red $\lambda = 628$ nm $\lambda = 710$ nm | 0.658 0.340 | 0.65 |
| 6 | $(La_{0.7}Y_{0.05}Eu_{0.22}Sm_{0.02}Gd_{0.015}Tb_{0.01}Zr_{0.005}O)_2S_1F_{0.01}$ | Dark red $\lambda = 628$ nm $\lambda = 710$ nm | 0.654 0.344 | 0.6 |
| 7 | $(La_{0.6}Y_{0.2}Eu_{0.16}Sm_{0.01}Gd_{0.01}Tb_{0.01}Pr_{0.005}Hf_{0.001}O)_2S_1F_{0.001}$ | Dark red $\lambda = 628$ nm $\lambda = 712$ nm | 0.640 0.352 | 0.75 |
| 8 | $(La_{0.7}Y_{0.2}Eu_{0.05}Sm_{0.01}Gd_{0.01}Tb_{0.01}Pr_{0.04}Hf_{0.005}O)_2S_1F_{0.001}$ | $\lambda = 626$ nm $\lambda = 710$ nm | 0.640 0.352 | 0.75 |
| 9 | $Y_2O_2S:Eu_{0.06}$ standard | $\lambda = 616$ nm $\lambda = 626$ nm | 0.640 0.346 | 0.80 | and roll length. The present invention provides improved measures for the conventional agro-film and its manufacturing techniques; 1. Three layers of agro-film are made with each layer being thicker and stronger; 2. the agro-film is made by a two-stage manufacturing process; and 3. the multilayer film undergoing blowing and adhering is cooled drastically and wrapped around a reel under an equiaxial stress state on both sides.

The constituent of the three-layer agro-film according to the present invention has the following characteristics. 1. All the three layers of agro-film are added with photo-transforming phosphor with the outer layer being the thickest and the inner layer being thinnest; 2. the outer and inner layers of the agro-film are added with photostabilizer to prevent the agro-film from being destroyed by the strong solar ultraviolet in water vapor atmosphere; 3. the inner layer of the agro-film is added with an agent to enhance the water stability of surface to avoid the condensation of water droplets and the water stabilizing agent for this purpose requires some stearate and its derivative; 4. the agro-film according to the present has low density polythene as its main constitute with a destiny of $\rho=0.91-0.92$ g/cm$^3$.

The present invention further points out that the agro-film should be manufactures as a film of uniform thickness with the thickness ratio of inner to outer layer being 1:2. The performance of the inner layer of the agro-film is enhanced by incorporating low density polythene (LDPE) and the sturdy polymer of the mixture of ethylene-vinyl acetate and polythene (forming EVA). It is confirmed according to the present invention that the composite is very sturdy without high cost, wherein EVA and LDPE accounts for less than 20% of the total mass. Thus, the total thickness of the three-layer agro-film is 100 (inner layer, 25 μm; outer layer, 25 μm; and middle layer, 50 μm) to 120 μm (inner layer, 30 μm; outer layer, 30 μm; and middle layer, 60 μm). The three-layer agro-film has the following physical-mechanical properties.

TABLE 2

| No. | Parameter | Specimen 1 | Specimen 2 | Specimen 3 |
|---|---|---|---|---|
| 1 | Transverse tensile strength kg/cm$^2$ | 250 230 | 280 260 | 260 250 |
| 2 | Transverse relative lengthening % | 250 300 | 280 340 | 320 360 |

The three-layer agro-film has these excellent physical-mechanical properties because the agro-film disclosed comprises sturdy translucent polymer films of uniform thickness intimately packed together arid the polymer is based on low-density polythene and/or ethylene-vinyl acetate and filled with phosphor, of which chemical composition conforms to the claim 1 and mass concentration is within 0.1-0.5%. Also, the film's outer and middle layers contain inorganic photo-transforming constituent accounting for a mass concentration of 0.2-0.6% and inner layer is added with organic stearic acid to prevent liquid droplet and water vapor from forming on the film surface, and thus the agro-film's surface will not be foggy and can maintain high light transmittance.

The three-layer agro-film has these excellent physical-mechanical properties because the agro-film disclosed comprises sturdy translucent polymer films of uniform thickness intimately packed together, and the polymer is based on low-density polythene and/or ethylene-vinyl acetate and filled with phosphor (its chemical composition is described above) having its mass concentration within 0.1-0.5%. Also, the film's outer and middle layers contain inorganic photo-transforming constituent accounting for a mass concentration of 0.2-0.6% and inner layer is added with organic stearic acid to prevent liquid droplet and water vapor from forming on the film surface, and thus the agro-film's surface will not be foggy and can maintain high light transmittance.

The present invention has conducted spectrum measurement for the light irradiating at the agro-film. When the agro-film is excited by ultraviolet, the light emitting includes res light of wavelength $\lambda=626-628$ nm and dark red light of wavelength $\lambda=708-710$ nm. The phosphor in the agro-film has a quantum efficiency of 50-90%. The fraction of radiation ultraviolet in solar radiation is about 6% and the enhancement of red light through photosynthetic excitation of the agro-film is 3-5%, which is enough to stimulate the photosynthesis of the green plants in greenhouse or hotbed. It has to point out that one important characteristic of the agro-film is its high luminance intensity. The luminance intensity generated by the three-layer agro-film filled with the phosphor according to the present invention comprising novel randomly distributed ultra-fine particles is 2.5-4 times of that of conventional agro-films.

Field tests have been conducted with the agro-films according to the present invention for eggplants and pepper in different climatic zone of Russian, China, and South Korea. In the summer of 2005, the total yield of the "Big California" sweet pepper grown in the Aubisque Greenhouse Farm, West Siberian, Russian, has been increased by 37%, with first batch of vegetable ripened ten days earlier. From Jul. 12 to Aug. 28, 2005, the Pusan Greenhouse Farm (South Korea) has seen its yield of eggplants increasing by 56% with the ripening period shortened by 17 days. In the mid-September, 2005, the three-layer agro-film was used in growing grapes in Jiangsu province, China, and each bunch of grapes was found to be plump, dark purple, sweet, and juicy with its yield being increased by 40%. The testing for the three-layer agro-film according to the present invention is currently undergoing.

In summary, the red light phosphor and multilayer photo-transforming film according to the present invention can increase the volumetric concentration of the oxysulfide phosphor in the agro-film and enhance the relative luminance intensity; they can increase the intensity of the radiation spectrum and have a high quantum efficiency as well as can transform the short-wavelength ultraviolet radiation into red-light radiation; the mean particle size of the phosphor is comparable to the wavelength of the red light and dark red light irradiating thereon and the agro-film is filled with fine phosphor, which is characterized by high photobiological activity and enhanced yield. Consequently, the phosphor and multilayer photo-transforming film according to the present invention can indeed overcome the drawbacks of conventional sulfur-containing red light phosphor and agro-film.

While the invention has been described with reference to the a preferred embodiment thereof, it is to be understood that modifications or variations may be easily made without departing from the spirit of this invention, which is defined by the appended claims.

What is claimed is:

1. A red light phosphor, comprising sulfide and activating agent wherein:
   the sulfide is a fluorine-sulfur oxide containing lanthanum-yttrium-zirconium and/or hafnium with overall stoichiometric formula as $(La_{1-x-y-z}Y_xA_yMe_z^{+4}O)_2S_1(F^{-1})_{2z}$, wherein x=0.001-0.2, y=0.01-0.2, z=0.001-0.005, and $Me^{+4}$ is selected from the group consisting of $Zr^{+4}$, $Hf^{+4}$, and combinations thereof; and the activating agent, A, comprises $TR^{+3}$ and $TR^{+4}$, wherein $TR^{+3}$ is selected from the group consisting of Eu, Sm, Gd, Tb, and combinations thereof, and $TR^{+4}$ is $Pr^{+4}$.

2. The red light phosphor as defined in claim 1, wherein when the ionic concentration ratio is 0.050<Eu/(Pr+Sm+Eu+Gd+Tb)≦0.15, the main radiation wavelength of the phosphor is within the range λ=615-628 nm.

3. The red light phosphor as defined in claim 2, wherein when the ionic concentration ratio is 0.06<(Eu+Sm)/$Tr^{+3}$≦0.095, the excited spectrum of the phosphor is within the ultraviolet wavelength range λ=320-410 nm.

4. The red light phosphor as defined in claim 1, wherein the mean particle size of the red light phosphor is within the range 0.4≦$d_{50}$≦0.8 μm with its largest size no more than d=6-8 μm.

* * * * *